US009422453B2

(12) United States Patent
Hagberg et al.

(10) Patent No.: US 9,422,453 B2
(45) Date of Patent: Aug. 23, 2016

(54) BITUMEN EMULSION CONTAINING POLYALUMINUM COMPOUNDS

(71) Applicant: Akzo Nobel Chemicals International B.V., Amersfoort (NL)

(72) Inventors: Daniel Hagberg, Kullavik (SE); Dennis Selse, Myggenäs (SE); Alan Duncan James, Chicago, IL (US)

(73) Assignee: AKZO NOBEL CHEMICALS INTERNATIONAL B.V., Amersfoort (NL)

( * ) Notice: Subject to any disclaimer, the term of this patent is extended or adjusted under 35 U.S.C. 154(b) by 0 days.

(21) Appl. No.: 14/437,545

(22) PCT Filed: Nov. 26, 2013

(86) PCT No.: PCT/EP2013/074670
§ 371 (c)(1),
(2) Date: Apr. 22, 2015

(87) PCT Pub. No.: WO2014/082981
PCT Pub. Date: Jun. 5, 2014

(65) Prior Publication Data
US 2015/0267080 A1    Sep. 24, 2015

(30) Foreign Application Priority Data
Nov. 28, 2012 (EP) .................................... 12194681

(51) Int. Cl.
*C09D 195/00* (2006.01)
*C08K 3/16* (2006.01)
*C08G 65/26* (2006.01)
*C08K 5/17* (2006.01)
*C08L 71/02* (2006.01)
*C08L 95/00* (2006.01)
*E01C 7/18* (2006.01)
*E01C 21/00* (2006.01)

(52) U.S. Cl.
CPC ........ *C09D 195/005* (2013.01); *C08G 65/2624* (2013.01); *C08K 3/16* (2013.01); *C08K 5/17* (2013.01); *C08L 71/02* (2013.01); *C08L 95/005* (2013.01); *E01C 7/182* (2013.01); *E01C 21/00* (2013.01); *C08K 2003/164* (2013.01); *C08L 2555/28* (2013.01); *C08L 2555/52* (2013.01); *C08L 2555/64* (2013.01); *C08L 2555/80* (2013.01)

(58) Field of Classification Search
CPC .... C09D 195/00; C08G 65/2624; C08K 3/16; C08K 3/22; C08K 5/17; C08L 71/02; C08L 95/00; C08L 95/005; E01C 7/182; E01C 21/00; D06N 5/00
See application file for complete search history.

(56) References Cited

U.S. PATENT DOCUMENTS

| 3,951,676 A | 4/1976 | Elste, Jr. | |
| 5,622,554 A * | 4/1997 | Krogh | C09D 195/00 106/284.06 |
| 8,404,037 B2 * | 3/2013 | Naidoo | C08L 95/00 106/273.1 |
| 2006/0219135 A1 * | 10/2006 | Thorstensson | C08K 5/5205 106/277 |
| 2010/0101981 A1 | 4/2010 | Moffett et al. | |

FOREIGN PATENT DOCUMENTS

| GB | 1511858 | 5/1978 |
| JP | 58021448 | 8/1983 |
| WO | 03/048256 A1 | 6/2003 |
| WO | 2005/012433 A1 | 2/2005 |

OTHER PUBLICATIONS

International Search Report and Written Opinion of PCT/EP2013/074670 date of mailing Mar. 21, 2014.
European Search Report for EP 12194681.8 dated May 7, 2013.
Nico M. Van Os et al., "Nonionic Surfatants: Organic Chemistry", in Surfactant Science Series, vol. 72, 1998, p. 1ff.
Kirk Othmer, Encyclopedia of Chemical Technology, vol. 2, pp. 518-537, electronic edition, published online: Aug. 15, 2003.

\* cited by examiner

*Primary Examiner* — Kaj K Olsen
*Assistant Examiner* — Alexander M Moore
(74) *Attorney, Agent, or Firm* — Nirav P. Patel

(57) ABSTRACT

The invention relates to an additive for a bitumen emulsion, which is a specific mixture of alkoxylated compounds with low and high amounts of alkylene oxide units, in combination with a polyaluminum compound. Using this additive it is possible to prepare an aqueous slow-setting bitumen emulsion-aggregate mix suitable for cold paving of roads, parking places, sidewalks, and the like.

19 Claims, No Drawings

BITUMEN EMULSION CONTAINING POLYALUMINUM COMPOUNDS

This application is a national stage filing under 35 U.S.C. §371 of PCT/EP2013/074670, filed Nov. 26, 2013, which claims priority to U.S. Provisional Patent Application No. 61/730,721 filed Nov. 28, 2012, and European Patent Application No. 12194681.8, filed Nov. 28, 2012, the contents of which are each incorporated herein by reference in their entireties.

FIELD OF THE INVENTION

The present invention relates to the manufacture of an aqueous bitumen-aggregate mix suitable for cold paving of roads, parking places, sidewalks, and the like. The bitumen-aggregate mix is manufactured by mixing aggregate and a bitumen emulsion containing an additive as an emulsifying and cohesion-increasing agent.

BACKGROUND OF THE INVENTION

Bitumen-in-water emulsions are used for road construction and repair, as well as in the construction industry as coatings and sealers. The asphalt properties are obtained after the emulsions set or cure, when the droplets of bitumen coalesce and adhere to the substrate and water is removed.

The rate of this setting process depends on the reactivity of the emulsion and the reactivity of the substrate. Emulsions are classified as rapid, medium and slow-setting types depending on their reactivity. Slow-setting emulsions find use in applications such as cold mix, where the emulsion is mixed with aggregates, and the mixture is used to pave roadways.

It is well-known in the art to prepare bitumen emulsions and to mix such emulsions with aggregates. When aggregates and the bitumen emulsion are mixed, the emulsion will "break" due to the attraction between the bitumen droplets and the aggregate surfaces. The bitumen droplets will deposit on the aggregate surfaces and be bonded to the aggregates by the electrostatic action at the interface between the bitumen droplets and the aggregates, and the residual bitumen will recover its macroscopic properties and act as a binder for the material with which it is used. This breaking speed must be adapted to suit the type of application intended for the emulsion. Slow setting emulsions have a slow breaking/setting of the emulsion in contact with aggregate and allow sufficient mixing of the emulsion and aggregate and also paving with these mixtures before it breaks. It is thus desired that the mixture retains a suitable consistency for paving for at least some hours after mixing. In addition, a strong cohesion between the bitumen and the aggregates as well as between the bitumen and the surface paved is advantageous. Further, a dense bitumen coating on the aggregates is desired.

A variety of amines and polyamines, and ethoxylated and/or quaternised derivatives thereof, has been used or suggested for use as emulsifiers and/or anti-stripping agents in bitumen emulsions.

WO 03/048256 relates to a bitumen-based, cold paving/coating formulation comprising water, a cationic bitumen emulsion, at least one first compound selected from the group consisting of alkali metal salts, alkali metal hydroxides, ammonium salts and ammonium hydroxide; and at least one second compound selected from the group consisting of Group IIA salts, Group IIIA salts, Group IIIB salts, copper salts, zinc salts, cadmium salts, manganese salts, iron salts, cobalt salts and nickel salts.

JP 58021448 relates to a high-viscosity bitumen emulsion prepared by emulsifying bitumen using an emulsifier composition containing a cationic emulsifier for bitumen and polyaluminum chloride. Among the cationic emulsifiers ethoxylated amines and polyamines are mentioned.

However, the bitumen residues (i.e. after curing of the emulsion) from slow-setting emulsions often show poor adhesion to silica-rich aggregates, such as quartzite. The result is poor durability of road materials prepared using these emulsions. Thus there is a need for improved slow-setting emulsion compositions giving a better adhesion of bitumen to the aggregates.

SUMMARY OF THE INVENTION

The object of the present invention is to at least partly meet the needs in the art, and to provide a slow-setting bitumen emulsion, where the bitumen residues after curing of the emulsion show good adhesion to aggregates, in particular to silica-rich aggregates.

It has now been found that by adding a specific mixture of alkoxylated compounds with low and high amounts of alkyleneoxy units, in combination with a polyaluminum compound, especially polyaluminum chloride (PAC), it is possible to prepare an aqueous slow-setting bitumen emulsion-aggregate mix suitable for cold paving. The bitumen residues from the slow-setting emulsion of the invention show excellent adhesion, notably better than shown by the residues derived from slow-setting cationic emulsions prepared with only amine ethoxylate mixtures. The cold mix asphalt has an open time (i.e. the time interval from the addition of the emulsion to the aggregates, to when the mixture becomes unworkable) of at least two hours and within about 1 week develops a high cohesion between the bitumen and the surface of the aggregates as well as between the bitumen and the paved surface. It also provides a dense bituminous coating of the solid surfaces.

As used in the present invention the term "asphalt" refers to a mixture comprising bitumen and aggregate.

DETAILED DESCRIPTION OF THE INVENTION

In a first aspect the invention relates to an additive for a bitumen emulsion containing
i) a polyaluminum compound, preferably polyaluminum chloride
ii) an alkoxylated amine having the formula

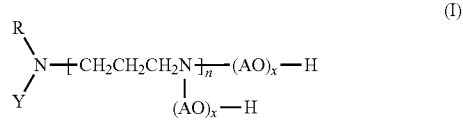

(I)

where R is a hydrocarbyl group having at least 10, preferably at least 12, and most preferably at least 14 carbon atoms; and at most 24, preferably at most 22, carbon atoms; n=0-3, preferably 0 or 1; each AO is independently ethyleneoxy or propyleneoxy, Y is a hydrocarbyl group having 1-24, preferably 1-4, and most preferably 1 carbon atoms, or a group $(AO)_xH$; and the sum of all x in (I) is at least 0.5, preferably at least 1, more preferably at least 1.5 and most preferably at least 2, and at most 10, preferably at most 9, more preferably at most 8, even more preferably at most 7, still more preferably at most 6, still more preferably at most 5, still more preferably at most 4 and most preferably at most 3; and iii) an alkoxylated compound having the formula

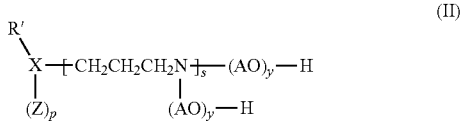
(II)

where R' is a hydrocarbyl group having at least 8, preferably at least 10, more preferably at least 12, and most preferably at least 14 carbon atoms; and at most 24, preferably at most 22, carbon atoms; X is N, C(=O)O or O; s=00-3, preferably 0 or 1; p=0 or 1; provided that when X is N, then p is 1 and when X is C(=O)O or O, then p is O; and Z is a hydrocarbyl group having 1-24, preferably 1-4, and most preferably 1 carbon atoms, or a group

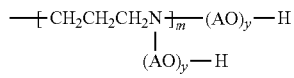

where m = 0-3;

where each AO independently is ethyleneoxy or propyleneoxy, the sum of all y in (II) is at least 12, preferably at least 14, more preferably at least 20, even more preferably at least 30, still more preferably at least 40, and at most 200, preferably at most 150 and most preferably at most 100; or castor oil that has been alkoxylated with at least 12, preferably at least 14, more preferably at least 20, even more preferably at least 30, still more preferably at least 40, and at most 200, preferably at most 150 and most preferably at most 100 moles of ethyleneoxide and/or propylene oxide oxide per mole of castor oil (III).

In one embodiment, AO in the alkoxylated amine (I) is ethyleneoxy. In another embodiment, AO in the alkoxylated amine (I) is propyleneoxy. In yet another embodiment, both ethyleneoxy units and propyleneoxy units are present in the groups (AO)x, for example such that from 10 to 90% of the total number of AO-units in the alkoxylated amine (I) are ethyleneoxy units.

In the alkoxylated compounds (II) and (Ill), preferably at least 50, more preferably at least 60, even more preferably at least 70, still more preferably at least 80, and most preferably at least 90, or 100% of the total number of AO-units are ethylenoxy units. The ethyleneoxy and the propyleneoxy units in the groups (AO)$_y$ may be present in any order, such as in random order, or in block arrangement, preferably in poly(PO)-block-poly(EO) arrangement.

The additive preferably has a weight ratio ii:iii of from 1:25 to 4:1, preferably 1:20 to 1:1, and most preferably 1:15 to 1:2, and a weight ratio between the polyaluminum compound and the sum of ii+iii of from 1:30 to 1:2, preferably from 1:20 to 1:5. Water will normally be present in the additive.

In a second aspect the invention relates to a bitumen emulsion comprising bitumen, water and the above-mentioned additive.

The emulsion preferably has a pH value below 8.
The bitumen emulsion suitably comprises
50-75% (w/w) bitumen
0.002-1.5% (w/w) of a polyaluminum compound, preferably polyaluminum chloride
0.05-3, preferably 0.1-2.5, more preferably 0.3-2.0% (w/w) of ii+iii 0-20, preferably 0-10, and most preferably 0-5% (w/w) of other conventional components and
balance water.

Polyaluminum compounds are based on aluminum, hydroxyl groups and anions, they are termed basic and in aqueous solutions they are polynuclear complexes. Polyaluminum compounds, such as polyaluminum chloride and polyaluminum chloride containing sulfate, are in themselves well-known compounds. As examples of suitable compounds can be mentioned polyaluminum compounds having the general formula $Al_n(OH)_m X_{3n-m}$ wherein X is a negative ion, such as chloride or acetate, and both n and no are positive integers so that 3n-m is greater than 0. Preferably X=Cl⁻ and such polyaluminum compounds are known as polyaluminum chlorides (PAC). Polyaluminum chlorides may be produced by adding base to aluminum chloride until an empirical formula of $Al(OH)_p(Cl)_{3-p}$, suitably with p from 1.0 to 2.5, is obtained. Polyaluminum chlorides can also contain anions from sulfuric acid, phosphoric acid, polyphosphoric acid, chromic acid, dichromic acid, silicic acid, citric acid, carboxylic acids or sulfonic acids. The basicity of polyaluminum compounds of the above given formula is defined as the ratio m/3n*100. The basicity is suitably within the range from 10 to 90% and preferably within the range from 20 to 85%.

To obtain the desired species of polyaluminum compound, the pH of the bitumen emulsion should suitably be below 8, preferably below 7.5, more preferably below 7.0, even more preferably below 6.5, still more preferably below 6.0 and most preferably below 5.5. The most preferred pH range for the emulsion is 4.0-5.5.

Acids may also be added to the composition. These acids may be organic or inorganic and monovalent or polyvalent. Examples of organic acids are carboxylic acids, such as formic acid, acetic acid, oxalic acid, malonic acid, tartaric acids, maleic acid, succinic acid, and citric acid. Other organic acids are alkyl esters of phosphoric acid. Examples of inorganic acids are hydrochloric acid, sulfuric acids, ortophosphoric acid, and phosphorous acid. Especially preferred acids are hydrochloric acid, orthophosphoric acid, formic acid, acetic acid and propionic acid.

The alkoxylated amines having formula (I) could be based on mono- or dialkylamines, preferably monoalkylamines, as starting materials, and the hydrocarbyl group(s) could be straight or branched, saturated or unsaturated. Examples of suitable hydrocarbyl groups are decyl, dodecyl, myristyl, cetyl, stearyl, oleyl, coco alkyl, tallow alkyl, tall alkyl, rapeseed alkyl, linseed alkyl, as well as hydrogenated unsaturated hydrocarbyl groups, such as hydrogenated tallow alkyl. The two hydrocarbyl groups of the dialkylamines could be the same or different. The latter compounds are the so-called asymmetrical amines, e.g. alkyl methylamines. Further, the starting amines could be mono- (n=0), di- (n=1), tri- (n=2) or tetraamines (n=3), preferably diamines, such as N-oleyl-aminopropylamine.

The alkoxylated compounds of formula (II) where X is N and p is 1 could be based on the same type of amines as the compounds of formula (I).

When Z is the group

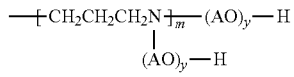

where m = 0-3;

for the sub-group of compounds where m=1-3, the amine is a so-called Y-amine, for example alkoxylated N,N-bis(3-aminopropyl)dodecylamine.

When X in formula (II) is O, p is 0, and the compound is an alkoxylated alcohol (when s=0) or an alkoxylated etheramine (when s=1-3).

When X in formula (II) is C(=O)O, p is 0, and the compound is an alkoxylated carboxylic acid, such as an alkoxylated fatty acid of natural origin. Such a product will normally be a mixture of a monoester between the carboxylic acid and polyalkylene glycol, where alkylene is ethylene or propylene, which compound is encompassed by formula (II), a diester between the acid and polyalkylene glycol, and unesterified polyalkylene glycol.

The above compounds are obtainable by methods well known in the art. For manufacturing of primary fatty amines and polyamines see Chapter "Fatty Amines" in *Kirk Othmer Encyclopedia of Chemical Technology*, Vol. 2, pp. 518-537, electronic edition, published online: Aug. 15, 2003.

The amine compounds of formula (I) and (II) are obtainable by alkoxylating a suitable alkyl amine, dialkylamine, alkyl polyamine, or alkyl Y-amine, such as a primary (fatty alkyl)monoamine, a secondary di(fatty alkyl)monoamine or (fatty alkyl)methylamine, a (fatty alkyl)aminopropyl amine or a (fatty alkyl) Y-triamine.

The number of moles of alkylene oxide reacting with the amine compounds, with the alcohols or with the fatty acids need not be an integer and represents the number average degree of polymerization of the ethylene oxide in the product (see "Nonionic Surfactants: Organic Chemistry" in *Surfactant science series* volume 72, 1998, p 1ff, edited by Nico M. van Os; Marcel Dekker, Inc).

In a third aspect the invention relates to a process for the manufacture of an aqueous bitumen-aggregate mix by
  a) providing a bitumen emulsion as described above; and
  b) mixing said emulsion with aggregate.

In a fourth aspect the invention relates to an aqueous bitumen-aggregate mix comprising
  2-40, preferably 2-15, more preferably 2-10% by weight of bitumen emulsion as described above; and
  60-98, preferably 85-98, more preferably 90-98% by weight of aggregate.

The bitumen emulsions may be mixed with aggregate in a central plant, whereupon the final mixture is stored before paving, or be mixed with aggregate in a mobile mixer-paver on-site and paved directly. The aggregates may be pre-wetted with water or with water comprising the polyaluminum compound.

The aggregate are typically of a solid material, often minerals, such as crushed rock, gravel and sand, blast furnace slag and/or reclaimed asphalt, preferably a densely graded mineral such as granite, limestone, quartzite, and dolomite. The type of aggregates suitable for use in the present invention is sometimes referred to in the art as "construction aggregate". The particle size distribution suitably includes both fines and coarser particles.

Suitable kinds of bitumen for use in the present invention are those commonly used in paving of roads, sidewalks, airport runways and parking lots, and in the techniques of cold emulsion mix, slurry seal, microsurfacing, and the like. The bitumen used in the present invention can be petroleum straight asphalt, semiblown asphalt, cut-back asphalt, natural asphalt, petroleum tar, pitch, heavy oil, and a mixture of two or more of these products. The bitumen can also be modified with polymers such as SBS (styrene-butadiene-styrene block copolymer) and EVA (ethylene-vinylacetate copolymer).

Also other conventional components can be present in the aqueous bitumen-aggregate mix and in the bitumen emulsion. Thus, the bitumen emulsion may contain organic solvents, such as white spirit, RME (rape seed methyl ester) and fuel oil, inorganic salts, such as calcium chloride, stabilizers, such as lignin amine, polysaccharide ethers, e.g. cellulose ethers, or other stabilizing polymers, and other emulsifiers which are nonionic or cationic surfactants containing at least one hydrocarbon group of 6-22 carbon atoms, preferably 8-22 carbon atoms, such as amide compounds, ethyleneoxy-containing amide compounds, acidified amidoamines, ethyleneoxy-containing amidoamines, imidazolines, polyamines, and quaternary ammonium compounds, and mixtures thereof. Specific examples of other emulsifiers are salts between acids, suitably polyvalent acids, such as a polyvalent phosphoric acid, and an imidazoline compound of the formula

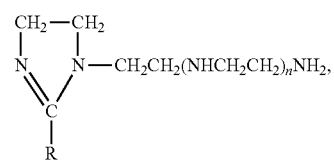

wherein R is an alkyl group of 5-21, preferably 7-19 carbon atoms, and n is a number from 0-3; or an amidoamine compound of the formula

wherein one or two of the groups $R_1$, $R_2$, $R_3$, and $R_4$ are an acyl group of 6-22, preferably 8-20 carbon atoms and the remaining groups $R_1$, $R_2$, $R_3$, and $R_4$ are lower alkyl groups of 1-4 carbon atoms, preferably methyl, hydroxyethyl, hydroxypropyl or hydrogen, and n is a number from 1 to 4, with the proviso that at least one nitrogen atom is part of an amino group.

The aqueous bitumen-aggregate mix can also contain an additional organic binder, for example latex, selected from the group consisting of SBR, polychloroprene, and natural latex, and mixtures thereof. The latex can be incorporated into the bitumen emulsion or directly into the mix. It may be necessary to use cationic or nonionic grades of latex compatible with the emulsion, as is well known in the art of emulsion formulation. The latex binder may impart desirable properties to the cured mixture including improved durability. The bitumen aggregate mix can also contain other components such as fibres and pigments.

The invention is further illustrated by the working examples below. Comparison examples are marked with an (*)

General Procedure

The emulsions were produced using a Scanroad Emulsion Plant 0.3R (SEP 0.3R) with an emulsion manufacturing capacity of 3-5 kg/minute. It is equipped with temperature controlled pots for bitumen and water, flow controllers for bitumen and water, controlled speed of the emulsion mill and pressure control of the emulsion production.

The CSS screening test consisted of two sets of mixes of aggregate, water and emulsion. One was mixed for 30 seconds (30 s mix) and the other one was mixed for 3 minutes (3 minutes mix).

30s mix was divided in three portions and evaluated with respect to coating, workability and adhesion.

Coating Test

⅓ of the 30 s mix was spread out on the table and the state of the coated aggregates was visually inspected. By this inspection, the area percentage of the aggregates coated by the bitumen was estimated.

Workability Test

⅓ of the 30 s mix was placed in a plastic bag and stored over night. The workability was estimated by checking the stiffness of the mix in the bag (1=good workability, not stiff/emulsion unbroken, 3=poor workability, stiff/emulsion broken).

Adhesion Test

⅓ of the 30 s mix was spread out on a metal plate and stored in the oven (60° C.) over night.

The mix was thereafter put in boiling water for 10 minutes and the state of the coated aggregates was visually inspected. By this inspection, the area percentage of the aggregates coated by the bitumen was estimated.

The 3 minutes mix was divided in two portions. One portion was spread out on a table and state of the coated aggregates was visually inspected. By this inspection, the area percentage of the aggregates coated by the bitumen was estimated. The other portion was rinsed under pouring water until the water phase was not brownish anymore and the state of the coated aggregates was visually inspected. By this inspection, the area percentage of the aggregates coated by the bitumen was estimated.

All amounts of the components in the compositions are given as weight percent based on the total weight of the composition, unless otherwise is explicitly indicated.

EXAMPLE 1

Aqueous bitumen-aggregate mixes were prepared by mixing
- a) 500 grams of aggregate of granite, consisting of the following fractions: 0-0.5 mm: 10 wt %; 0.5-2 mm: 15 wt %, 2-4 mm; 10 wt %%; 4-8 mm: 20 wt %; 8-11 mm: 45 wt %;
- b) 12 grams of water; and
- c) 40 grams of an oil-in-water bitumen emulsion containing 62% by weight of bitumen and emulsifiers in an amount in accordance with Table 1, at a temperature of about 20° C.

TABLE 1

|  | Emulsion no | |
| --- | --- | --- |
|  | 1* | 2* |
| Components | | |
| Bitumen | 62.0 | 62.0 |
| Lignin Amine (ex Innventia AB) | 0.097 | 0.097 |
| N-Tallow alkyltrimethylene-diamine + 15EO | 0.078 | 0.078 |
| N-oleyltrimethylene-diamine + 2.5EO | 0.023 | 0.023 |
| Hydrogenated tallow alkylamine + 50EO | 0.26 | 0.26 |
| Water | To 100 | To 100 |
| Production data | | |
| pH water phase | 2.3 | 2.8 |
| Bitumen flow, l/h | 197.9 | 197.9 |
| Water phase flow, l/h | 114 | 114 |
| Temp. water, ° C. | 50 | 51 |
| Temp. Bitumen, ° C. | 140 | 140 |
| Emulsion temperature, ° C. | 90 | 91 |
| Mill speed, rpm | 9120 | 9120 |
| Pressure after mill, barg | 1.2 | 1.2 |

PAC was post added to the emulsions. 4.40 g of ATC 8210 (10% PAC solution; ex Akzo Nobel) were post added to one litre of emulsion and mixed for 5 minutes with an IKA mixer RW 20 DZM at 200 rpm.

The result is presented in table 2.

TABLE 2

| Emulsion | 1* | 1 + PAC | 2* | 2 + PAC |
| --- | --- | --- | --- | --- |
| 30 s mix. Coating [%] | 100 | 100 | 100 | 100 |
| 30 s mix. Workability | 1 | 1 | 1 | 1 |
| 30 s mix. Adhesion after boiling [%] | 20 | 80 | 20 | 80 |
| 3 minutes mix. Coating [%] | 100 | 100 | 100 | 100 |
| 3 minutes mix. Coating after rinsing [%] | 0 | 0 | 0 | 0 |

EXAMPLE 2

Aqueous bitumen-aggregate mixes were prepared by mixing
- a) 166.7 grams of an aggregate of granite, consisting of the following fractions: 0-0.5 mm: 10 wt %; 0.5-2 mm: 15 wt %, 2-4 mm; 10 wt %; 4-8 mm: 20 wt %; 8-11 mm: 45 wt %;
- b) 4 grams of water; and
- c) 13.3 grams of an oil-in-water bitumen emulsion containing 62% by weight of bitumen and emulsifiers in an amount in accordance with Table 3, at a temperature of about 20° C.

TABLE 3

|  | Emulsion no | | | |
| --- | --- | --- | --- | --- |
|  | 3* | 4[a] | 5[b] | 6[c] |
| Components | | | | |
| Bitumen | 62.0 | 62.0 | 62.0 | 62.0 |
| Lignin Amine | 0.097 | 0.097 | 0.097 | 0.097 |
| N-Tallow alkyltrimethylene-diamine + 15EO | 0.078 | 0.078 | 0.078 | 0.078 |
| N-oleyltrimethylene-diamine + 2.5EO | 0.023 | 0.023 | 0.023 | 0.023 |
| Hydrogenated tallow alkylamine + 50EO | 0.26 | 0.26 | 0.26 | 0.26 |
| PAC (10%) | — | 0.42 | 0.42 | 0.42 |
| Water | To 100 | To 100 | To 100 | To 100 |
| Production data | | | | |
| pH water phase | 3.8 | 3.4 | 3.6 | 3.6 |
| Bitumen flow, l/h | 196 | 196 | 196 | 196 |
| Water phase flow, l/h | 114 | 114 | 114 | 114 |
| Temp. water, ° C. | 47 | 47 | 47 | 47 |
| Temp. Bitumen, ° C. | 145 | 145 | 145 | 145 |
| Emulsion temperature, ° C. | 90 | 90 | 90 | 90 |

TABLE 3-continued

| | Emulsion no | | | |
|---|---|---|---|---|
| | 3* | 4[a] | 5[b] | 6[c] |
| Mill speed, rpm | 9120 | 9120 | 9120 | 9120 |
| Pressure after mill, barg | 1.2 | 1.2 | 1.2 | 1.2 |

[a]Water phase with emulsifiers and PAC was produced one day in advance of emulsification
[b]PAC and Emulsifiers were mixed and stored at room temperature during 2 months
[c]PAC and Emulsifiers were added to water phase just before emulsification.

The result is presented in table 4.

TABLE 4

| Emulsion | 3* | 3 + PAC | 4[a] | 5[b] | 6[c] |
|---|---|---|---|---|---|
| 30 s mix. Coating [%] | 100 | 100 | 100 | 100 | 100 |
| 30 s mix. Adhesion after boiling [%] | 10 | 80 | 85 | 95 | 90 |
| 3 minutes mix. Coating [%] | 100 | 100 | 100 | 100 | 100 |
| 3 minutes mix. Coating after rinsing [%] | 0 | 0 | 0 | 0 | 0 |

Emulsion "3+PAC" was prepared according to the following: PAC was post added to the emulsion (3): 4.40 g of ATC 8210 (10% PAC solution; ex Akzo Nobel) were post added to one litre of the emulsion and mixed for 5 minutes with an IKA mixer RW 20 DZM at 200 rpm.

EXAMPLE 3

Aqueous bitumen-aggregate mixes were prepared by mixing
a) 166.7 grams of an aggregate of granite, consisting of the following fractions: 0-0.5 mm: 10 wt %; 0.5-2 mm: 15 wt %, 2-4 mm; 10 wt %; 4-8 mm: 20 wt %; 8-11 mm: 45 wt %;
b) 4 grams of water,
c) 13.3 grams of an oil-in-water bitumen emulsion containing 62% by weight of bitumen and emulsifiers in an amount in accordance with Table 5, at a temperature of about 20° C.

TABLE 5

| | Emulsion no | | |
|---|---|---|---|
| Components | 7 | 8 | 9 |
| Bitumen | 62.0 | 62.0 | 62.0 |
| PAC (20%) (Ekoflock 54, ex Feralco Nordic AB) | 0.2 | 0.2 | 0.2 |
| Lignin Amine | — | 0.097 | — |
| N-Tallow alkyltrimethylene-diamine + 15EO | 0.078 | 0.078 | 0.078 |
| N-oleyltrimethylene-diamine + 2.5EO | 0.023 | 0.023 | 0.023 |
| Hydrogenated tallow alkylamine + 50EO | 0.26 | 0.26 | 0.26 |
| Methyl hydroxyethyl cellulose | — | — | 0.1 |
| Water | To 100 | To 100 | To 100 |
| pH water phase | 3.33 | 3.63 | 3.35 |

The result is presented in table 6.

TABLE 6

| Emulsion | 7 | 8 | 9 |
|---|---|---|---|
| Adhesion | 70% | 80% | 80% |
| Workability | 1 | 1 | 1 |

EXAMPLE 4

Aqueous bitumen-aggregate mixes were prepared by mixing
a) 166.7 grams of an aggregate of granite, consisting of the following fractions: 0-0.5 mm: 10 wt %; 0.5-2 mm: 15 wt %, 2-4 mm; 10 wt %; 4-8 mm: 20 wt %; 8-11 mm: 45 wt %;
b) 4 grams of water,
c) 13.3 grams of an oil-in-water bitumen emulsion containing 62% by weight of bitumen an emulsifiers in an amount in accordance with Table 7, at a temperature of about 20° C.

TABLE 7

| | Emulsion no | | | | | | | |
|---|---|---|---|---|---|---|---|---|
| Components | 10 | 11 | 12 | 13 | 14 | 15 | 16 | 17 |
| Bitumen | 62.0 | 62.0 | 62.0 | 62.0 | 62.0 | 62.0 | 62.0 | 62.0 |
| PAC (20%) | 0.2 | 0.2 | 0.2 | 0.2 | 0.2 | 0.2 | 0.2 | 0.2 |
| N-Tallow alkyltrimethylene-diamine + 15EO | 0.11 | — | 0.11 | — | 0.11 | — | 0.11 | — |
| N-oleyltrimethylene-diamine + 2.5EO | — | 0.11 | — | 0.11 | — | 0.11 | — | 0.11 |
| Hydrogenated tallow alkylamine + 50EO | 0.26 | 0.26 | — | — | — | — | — | — |
| $C_{16-22}$ alcohol + 80EO | — | — | 0.26 | 0.26 | — | — | — | — |
| Decanoic acid monoethanolamide + 50EO | — | — | — | — | 0.26 | 0.26 | — | — |
| Castor Oil + 40EO | — | — | — | — | — | — | 0.26 | 0.26 |
| Water | To 100 | To 100 | To 100 | To 100 | To 100 | To 100 | To 100 | To 100 |
| pH water phase | 3.65 | 3.8 | 3.5 | 3.7 | 3.3 | 3.4 | 3.5 | 3.7 |

The result is presented in table 8.

TABLE 8

| Emulsion | 10 | 11 | 12 | 13 | 14 | 15 | 16 | 17 |
|---|---|---|---|---|---|---|---|---|
| Emulsification | Ok | Ok | Ok | Ok | Ok | Ok | Ok | Ok |
| Stability over night | Ok | Ok | Ok | Ok | Ok | Ok | Ok | Ok |
| Adhesion | 30% | 60% | 20% | 60% | 30% | 70% | 20% | 90% |
| Workability | 1 | 1 | 1 | 1 | 1 | 1 | 1 | 1 |

EXAMPLE 5

Aqueous bitumen-aggregate mixes were prepared by mixing a) 166.7 grams of an aggregate of granite, consisting of the following fractions: 0-0.5 mm: 10 wt %; 0.5-2 mm: 15 wt %, 2-4 mm; 10 wt %; 4-8 mm: 20 wt %; 8-11 mm: 45 wt %;

b) 4 grams of water, c) 13.3 grams of an oil-in-water bitumen emulsion containing 62% by weight of bitumen and emulsifiers in an amount in accordance with Table 9, at a temperature of about 20° C.

TABLE 9

| | Emulsion no | | | | |
|---|---|---|---|---|---|
| Components | 18 | 19* | 20 | 21* | 22 |
| Bitumen 160/220 | 62.0 | 62.0 | 62.0 | 62.0 | 62. |
| PAC (20%) | 0.2 | 0.2 | 0.2 | 0.2 | 0.2 |
| Lignin Amine | 0.097 | 0.097 | 0.13 | 0.097 | 0.097 |
| N-Tallow alkyltrimethylene-diamine + 15EO | 0.078 | — | 0.1 | — | 0.279 |
| N-oleyltrimethylene-diamine + 2.5EO | 0.023 | 0.31 | 0.03 | — | 0.0822 |
| Hydrogenated tallow alkylamine + 50EO | 0.26 | — | — | 0.31 | — |
| NonylPhenol + 50EO | — | — | 0.32 | — | — |

TABLE 9-continued

| | Emulsion no | | | | |
|---|---|---|---|---|---|
| Components | 18 | 19* | 20 | 21* | 22 |
| Water | To 100 | To 100 | To 100 | To 100 | To 100 |
| pH water phase | 3.63 | 3.87 | 3.8 | 3.7 | 3.5 |

The result is presented in table 10.

TABLE 10

| Emulsion | 18 | 19 | 20 | 21 | 22 |
|---|---|---|---|---|---|
| Emulsification | Ok | Ok | Ok | — | Ok |
| Stability over night | Ok | Ok | Ok | — | Ok |
| Adhesion | 75% | 90% | 75% | — | 75% |
| Workability | 1 | 3 | 1 | — | 1 |

EXAMPLE 6

Aqueous bitumen-aggregate mixes were prepared by mixing a) 166.7 grams of an aggregate of granite, consisting of the following fractions:
0-0.5 mm: 10 wt %; 0.5-2 mm: 15 wt %, 2-4 mm; 10 wt %; 4-8 mm: 20 wt %; 8-11 mm: 45 wt %;

b) 4 grams of water, c) 13.3 grams of an oil-in-water bitumen emulsion containing 62% by weight of bitumen and emulsifiers in an amount in accordance with Table 9, at a temperature of about 20° C.

TABLE 11

| | Emulsion no | | | | | |
|---|---|---|---|---|---|---|
| Components | 23* | 24 | 25* | 26 | 27 | 28 |
| Bitumen | 62.0 | 62.0 | 62.0 | 62.0 | 62.0 | 62.0 |
| PAC (20%) | — | 0.20 | — | 0.20 | 0.20 | 0.20 |
| Lignin Amine | 0.104 | 0.104 | 0.104 | 0.104 | 0.104 | 0.104 |
| N-Tallow alkyltrimethylene-diamine + 15EO | 0.081 | 0.081 | 0.081 | 0.081 | 0.081 | 0.081 |
| N-oleyltrimethylene-diamine + 2.5EO | 0.023 | 0.023 | — | — | — | 0.023 |
| N-oleyltrimethylene-diamine + 2PO | — | — | 0.023 | 0.023 | 0.023 | — |
| Hydrogenated tallow alkylamine + 50EO | 0.25 | 0.25 | 0.25 | 0.25 | — | — |
| $C_{16-22}$ alcohol + 80EO | — | — | — | — | 0.25 | — |
| Hydrogenated tallow alkylamine + 4PO + 40EO | — | — | — | — | — | 0.25 |
| Water | To 100 | To 100 | To 100 | To 100 | To 100 | To 100 |
| pH water phase | 3.5 | 3.6 | 3.4 | 3.5 | 3.5 | 3.6 |

The result is presented in table 12.

TABLE 12

| Emulsion no | 23 | 24 | 25 | 26 | 27 | 28 |
|---|---|---|---|---|---|---|
| 30 s mix. Coating [%] | 100 | 100 | 100 | 100 | 100 | 100 |
| 30 s mix. Adhesion after boiling [%] | 40 | 85 | 25 | 85 | 85 | 85 |
| 30 s mix. Workability | 1 | 1 | 1 | 1 | 1 | 1 |
| 3 minutes mix. Coating [%] | 100 | 100 | 100 | 100 | 100 | 100 |
| 3 minutes mix. Coating after rinsing [%] | 0 | 0 | 0 | 0 | 0 | 0 |

The invention claimed is:

1. An additive for a bitumen emulsion comprising
i) a polyaluminum compound;
ii) an alkoxylated amine having the formula:

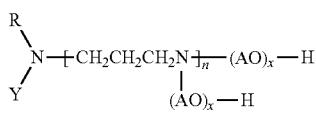

where R is a hydrocarbyl group having from 10 to 24 carbon atoms; n=0-3; each AO is independently ethyleneoxy or propyleneoxy, Y is a hydrocarbyl group having 1-24 carbon atoms, or a group $(AO)_xH$; and the sum of all x in (I) is 0.5-10; and
iii) an alkoxylated compound having the formula:

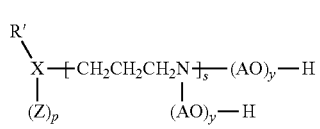

where R' is a hydrocarbyl group from 8 to 24 carbon atoms; X is N, C(=O)O or O; s=0-3; p=0 or 1; provided that when X is N, then p is 1 and when X is C(=O)O or O, then p is 0; and Z is a hydrocarbyl group having 1-24 carbon atoms, or a group

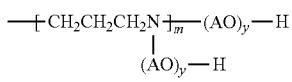

where m = 0-3;

where each AO independently is ethyleneoxy or propyleneoxy, and the sum of all y in (II) is from 12 to 200; or castor oil that has been alkoxylated 12 to 200 moles of ethylene oxide and/or propylene oxide per mole of castor oil (III).

2. The additive according to claim 1, wherein the sum of all x in formula (I) is from 0.5 to 5.

3. The additive according to claim 1, wherein the sum of all y in formula (II) is from 14 to 100.

4. The additive according to claim 1, wherein the AO in formula (I) is ethyleneoxy.

5. The additive according to claim 1, wherein the AO in formula (I) is propyleneoxy.

6. The additive according to claim 1, wherein at least 50% of the total number of AO-units in formula (II) or castor oil (III) is ethyleneoxy units.

7. The additive according to claim 1, wherein the AO in formula (II) is ethyleneoxy.

8. The additive according to claim 1, wherein the weight ratio of the alkoxylated amine to the alkoxylated compound is 1:25 to 4:1, and wherein the weight ratio of the polyaluminum compound to the sum of the alkoxylated amine and the alkoxylated compound is 1:30 to 1:2.

9. A bitumen-in-water emulsion comprising the additive according to claim 1, bitumen and water.

10. The bitumen emulsion according to claim 9, comprising
50-75% (w/w) bitumen;
0.002-1.5% (w/w) of the polyaluminum compound;
0.05-3% (w/w) of the total of the alkoxylated amine and the alkoxylated compound;
0-20% (w/w) of other conventional components; and with the balance being water.

11. The bitumen emulsion according to claim 9, having a pH below 8.

12. The bitumen emulsion according to claim 9, wherein X in formula (II) is N and p is 1.

13. The bitumen emulsion according to claim 9, wherein Z is the group:

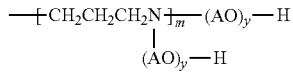

where m = 0-3.

14. The bitumen emulsion according to claim 9, wherein X in formula (II) is O, p is 0 and s is 0.

15. A process for the manufacture of an aqueous bitumen-aggregate mix comprising the steps of:
a) providing the bitumen emulsion according to claim 9; and
b) mixing said emulsion with an aggregate.

16. An aqueous bitumen-aggregate mix comprising 2-40% by weight of the bitumen emulsion according to claim 9; and 60-98% by weight of an aggregate.

17. A method for paving a surface of a road, a sidewalk, a parking lot or an airport runway comprising the step of:
spreading the bitumen-aggregate mix according to claim 16 on the surface, or
spreading the bitumen emulsion according to claim 9 on a surface at least partially covered by an aggregate.

18. The additive of claim 1, wherein the polyaluminum compound is polyaluminum chloride.

19. The bitumen emulsion of claim 10, wherein the polyaluminum compound is polyaluminum chloride.

* * * * *